July 31, 1951 W. H. SILVER ET AL 2,562,747
DISK TILLER
Filed Feb. 8, 1946 2 Sheets-Sheet 1

INVENTORS
WALTER H. SILVER
JOHN I. CANTRAL
BY
ATTORNEYS.

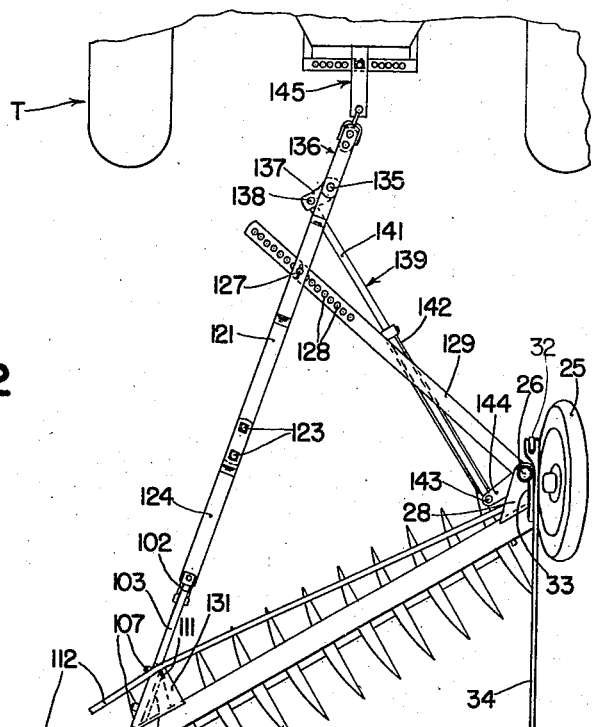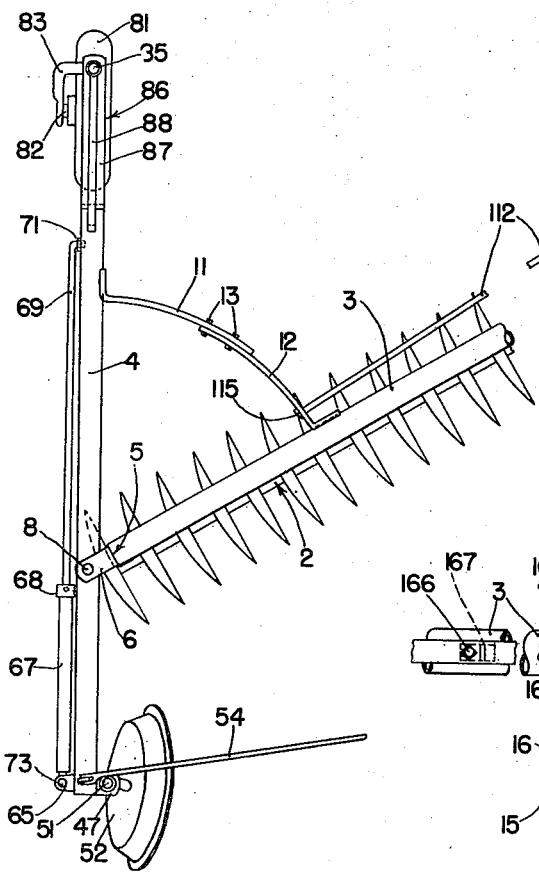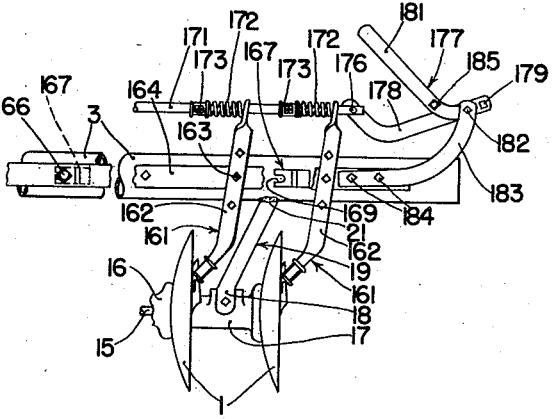

Patented July 31, 1951

2,562,747

UNITED STATES PATENT OFFICE 2,562,747

DISK TILLER

Walter H. Silver and John I. Cantral, Moline, Ill., assignors to Deere & Company, Moline, Ill., a corporation of Illinois Application February 8, 1946, Serial No. 646,256

3 Claims. (Cl. 97—53)

The present invention relates generally to agricultural implements and more particularly to ground working implements of the type commonly known as disk tillers.

The object and general nature of the present invention is the provision of a novel disk tiller having exceptionally large capacity but which is not excessively heavy or unwieldy. More specifically, it is a feature of this invention to provide a disk tiller or similar implement having a frame arrangement so constructed that tendency for the forward draft to overturn the implement forwardly is substantially eliminated. A further feature of this invention is the provision of a disk tiller or similar implement of the large capacity type in which the main frame of the implement is made up of two tubular members suitably connected together, providing maximum strength and width and minimum weight of parts. Another feature of this invention is the provision of a disk tiller in which the landward end of the main frame includes a fore and aft extending part supported on ground wheels, the forward ground wheel being in the form of a caster wheel so constructed and arranged as to facilitate making turns, either to the right or left.

Another feature of this invention is the provision of means for not only adjustably connecting the rear furrow wheel with the main frame for vertical movement relative thereto but, additionally, to provide new and simplified means for adjusting the lead or angular position of the rear ground wheel about a generally vertical axis.

Further, another feature of this invention is the provision of an improved scraper mounting for an implement of this type, with improved means for controlling the positions of the several scrapers.

These and other objects and advantages of the present invention will be apparent to those skilled in the art after a consideration of the following detailed description, taken in conjunction with the accompanying drawings in which:

Figure 2 is a plan view of the implement shown in Figure 1.

Figure 3 is a fragmentary rear view showing the improved scraper mounting.

Figure 1:
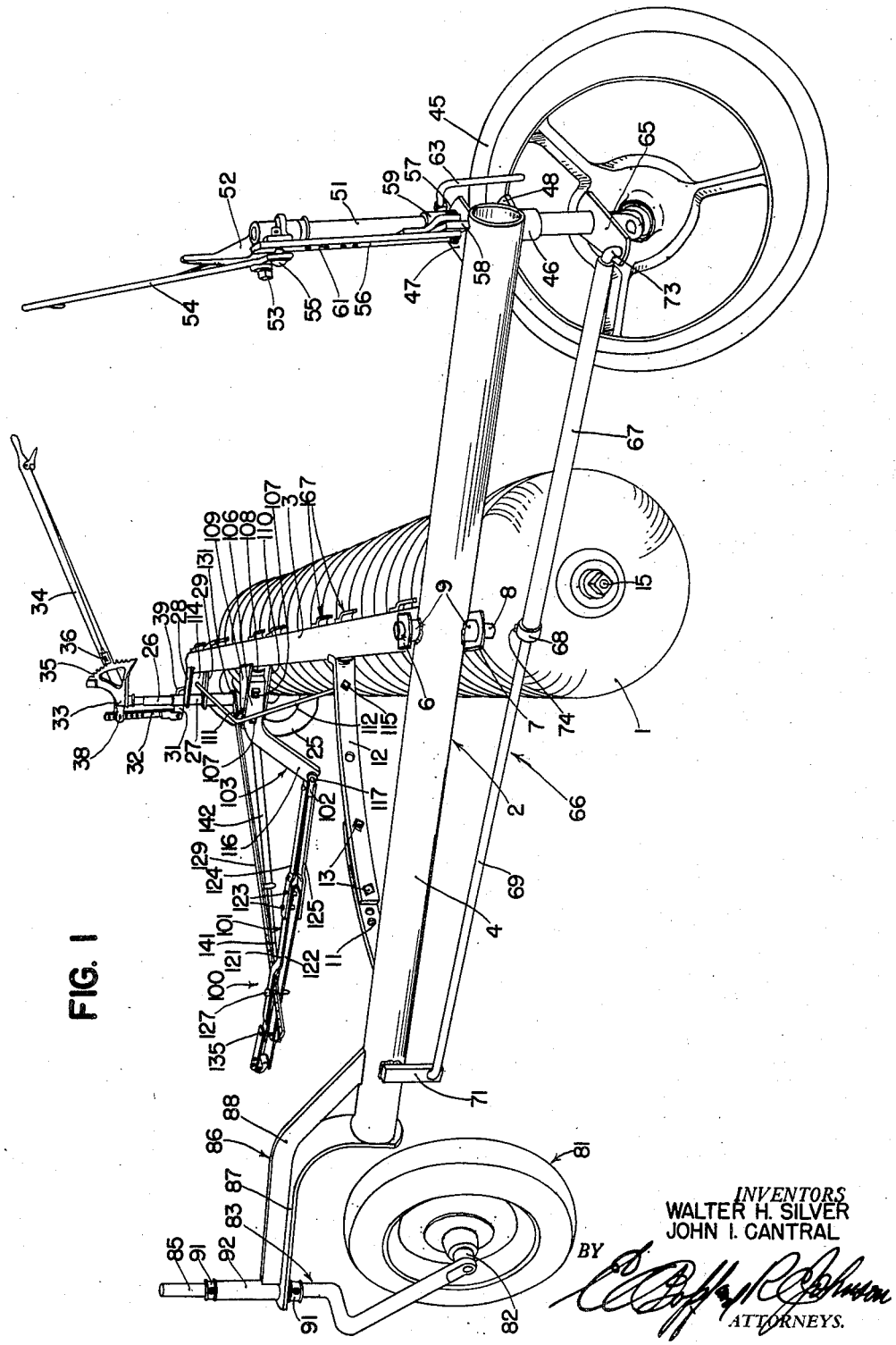
Figure 1 is a perspective view of a disk tiller in which the principles of the present invention have been incorporated.

Referring to Figures 1 and 2, the implement in which the principles of the present invention have been embodied, and illustrated in the drawings by way of example, is a disk tiller comprising two or more gangs of disks 1 supported on a main frame that is indicated in its entirety by the reference numeral 2. The frame 2 is made up of a diagonally disposed tubular member 3, preferably of round pipe stock, and a generally fore and aft extending tubular member 4, also formed of round pipe stock. The rear end of the tubular member 3 has a bifurcated section which comprises a generally U-shaped member 5 secured, as by welding, to the rear end of the pipe member 3 and having upper and lower arms 6 and 7 which are spaced apart vertically and apertured to receive a pivot pin 8 which extends generally vertically through a bearing bushing 9 carried by the generally central portion of the fore and aft extending tubular member 4. Preferably, the latter member is apertured to receive the bearing bushing 9 and the latter is secured to the pipe 4, as by welding, so as to form, in effect, an integral part thereof. The frame 2 also includes a pair of arcuate members 11 and 12. The adjacent ends of the members 11 and 12 are arranged in overlapping relation and are apertured to receive one or more connecting bolts 13. The outer end of the arcuate member 11 is secured, as by welding, to the forward portion of the fore and aft extending pipe member 4, and the rear or outer end of the other arcuate member 12 is secured, as by welding, to the forward side of the diagonal pipe or tubular member 3, generally adjacent the rear portion thereof, as best shown in Figure 2. By removing the bolts 13 and shifting the diagonal member 3, relative to the fore and aft extending member 4, the proper or desired angular relation between these parts may be varied, as desired, so as to change or adjust the angle of cut. Inserting the bolts 13 in the proper holes in the arcuate members 11 and 12 serves, when the bolts are tightened, to retain the desired angular adjustment between the diagonal or main frame member and the landward or fore and aft extending member.

As best shown in Figure 3, each gang of disks includes a gang bolt 15 and spacing thimbles 16, certain of which, as indicated by the reference numeral 17 in Figure 3, have suitable bearing means and receive the lower or bifurcated end 18 of the associated disk standard 19, the upper end of which is welded, as at 21, or otherwise securely fixed to the main frame 2.

The furrowward side of the main frame is carried on a front furrow wheel 25 which is journaled for rotation on the lower laterally outturned end of a generally vertically disposed front wheel spindle 26. The latter is shiftably disposed in a sleeve section 27 that is rigidly connected to the front end of the tubular member 3 by upper and lower plates 28 and 29, both welded or otherwise fixed to the tube 3 and likewise fixed to the sleeve 27. The upper end of the latter carries an apertured lug 31 to which the lower end of a link 32 is pivotally connected. A cap member 33 is swingably mounted on the upper end of the spindle 26 and pivotally receives an adjusting lever 34, the cap member 33 including a sector 35 notched to cooperate with detent mechanism 36 carried by the hand lever 34. The forward end of the hand lever is pivotally connected, as at 38, in one of several openings in the link 32. The upper end of the sleeve section 27 receives a hand operated set screw member 39 which is normally loosened so as to permit raising and lowering the front end of the frame relative to the front furrow wheel 25 for swinging the hand lever 34, but which may be tightened, as when the frame has been lifted the full amount by one stroke of the hand lever 34, so as to permit the pivot 38 to be detached and the hand lever 34 swung upwardly, after which the pivot 38 may be reattached to the link 32 so as to provide an extra high lift by a second stroke of the hand lever 34, where such high lift is desired or necessary.

The rear end of the fore and aft extending tubular member 4 is supported on a rear furrow row wheel 45 for adjustment relative thereto in a vertical direction, generally in the same manner that the frame is carried on the front furrow wheel 25. As best shown in Figure 1, a sleeve section 46 is secured, as by welding, to a pair of upper and lower plates 47 and 48, which are welded or otherwise secured to the rear end of the pipe member 4. A furrow wheel spindle 51 is disposed for both vertical sliding movement and also rocking movement about a vertical axis, in the sleeve section 46. Like the spindle 25, the spindle 51 carries a cap member 52 at its upper end, the latter carrying a pivot 53 by which a hand lever 54 may be pivotally mounted thereon, the outer end of the hand lever 54 being connected by a pivot 55 with the upper end of a link 56. The lower end of the link 56 is pivotally connected, as at 57, to a lug 58 that is secured, as by welding, to the upper end 59 of the vertical sleeve section 46. The link 56, like the link 32, is also provided with a plurality of openings, indicated at 61, to receive the hand lever pivot 55 in any one of a number of different positions, and for securing the frame sleeve section 46 to the spindle 51 when changing the connection between the hand lever 54 and the link 56, we provide a handle type set screw member 63, which is similar to the member 39 described above.

The lead, or angular disposition of the plane of the wheel 45 with respect to the direction of forward travel of the implement, may be adjusted by swinging the rear furrow wheel 45 about a vertical axis, and to retain any desired adjustment, we provide an arm 65 on the lower end of the spindle 51, the outer end of the arm being apertured to receive the rear end of a link construction 66 which at its forward end is anchored to the frame member 4. Preferably, the link construction 66 includes a rear pipe section 67 carrying a collar 68 and a front section 69 telescopically associated at its rear end with the front end of the pipe section 67. The front end of the forward link section 69 is turned laterally and pivotally connected with a bracket 71 that is secured, as by welding, to the forward end portion of the tubular frame member 4. The rear end of the pipe section 67 receives a hook section 73 which is pivotally received in the aperture in the steering arm 65 on the spindle 51. The collar 68 has a set screw 74 which may be loosened to accommodate shifting the pipe section 67 either forwardly or rearwardly along the rear end of the link section 69 for the purpose of adjusting the angular position of the rear furrow wheel 45. After the desired adjustment has been made, the set screw 74 is tightened so as to retain that position of adjustment.

The front end of the fore and aft extending tubular frame bar 4 is mounted on a land wheel 81 which is of the caster wheel type. To this end, the wheel 81 is mounted on an axle 82 that is carried at the lower end of a spindle member 83, the wheel receiving portion thereof extending downwardly and rearwardly and the upwardly extending portion 85 thereof serving to swingably connect the spindle 83 with a bracket 86 that is secured to and forms a part of the front end of the frame member 4. Specifically, the bracket 86 comprises a generally L-shaped part 87 and a reenforcing rib or truss 88, both welded at their rear ends to the front end of the frame member 4, thereby providing a bracket construction which is offset upwardly so as to provide clearance for the caster wheel 81. The spindle 83 is held in vertical adjustment by upper and lower set screw collars 91 and 92. Normally, it is not necessary to change the vertical position of the front caster wheel 81, the fore and aft extending frame 4 being of such length that the disks 1 may be raised out of the ground a distance adequate for transport purposes by raising the frame on the front and rear furrow wheel spindles 26 and 51 by manipulating the hand levers 24 and 54, as mentioned above.

The hitch construction is indicated in its entirety by the reference numeral 100 and comprises a drawbar 101 connected at its rear end by a swivel 102 to a drawbar support bracket 103 connected to the main frame tube 3. The drawbar bracket 103 comprises a bar bent as shown in Figure 1 and having a rear portion 106 connected by bolts 107 to an attaching plate 108 that is secured, as by welding, between upper and lower plates 109 and 110 which are welded along their rear edges to the front side of the main frame pipe 3. The upper plate 109 adjacent its forward end carries a lug 111 against which a truss rod 112 bears. The right end of the truss rod is connected to a plate 114 that is secured, as by welding, to the front furrow wheel attachment plates 28 and 29, and the rear or left end of the truss rod 112 is connected to the inner arcuate bar 12, as indicated by the reference numeral 115. The lower end 116 of the drawbar support member 103 is apertured to receive a pivot pin 117 connecting the swivel 102 thereto. The drawbar structure 101 comprises upper and lower straps 121 and 122 spaced apart vertically and bolted, as at 123, to a pair of auxiliary straps 124 and 125, the rear ends of which are connected to the swivel 102. The forward portions of the straps 121 and 122 are apertured to receive a pin 127 which is inserted in any one of a number of apertures 128 (Figure 2) that are formed in the front portion of a steering link 129, the rear end of which is connected with the lower end of the front furrow wheel spindle 26, as indicated at 131 in Figure 1. Pivoted as at 135, to the front end of the drawbar straps 121 and 122 is a hitch bell crank 136, the rear end 137 of which is pivotally connected, as at 138, to an adjustable steering link 139 formed of two telescopically associated sections 141 and 142. The rear section, which is preferably a pipe, is pivotally connected, as at 143, to the outer end of a steering arm 144 which, as best shown in Figure 2, extends laterally inwardly from the lower end of the front furrow wheel spindle 26. The hitch bell crank 136 is connected to the drawbar 145 of a tractor T. The drawbar 145 may swing about its usual connection with the tractor body or it may be bolted and thus held against swinging, as desired.

As best shown in Figure 2, the lateral disposition of the implement relative to the tractor may be varied by removing the pin 127, disconnecting the telescopically associated steering link sections 141 and 142 and then swinging the front end of the hitch to different lateral positions, and then reconnecting the above mentioned parts. Also, where a relatively long hitch is desired, the auxiliary drawbar straps 124 and 125 may be arranged as shown in Figures 1 and 2, but if a short hitch should be desired, the strap members 124 and 125 may be removed and the rear ends of the drawbar straps 121 and 122 connected directly to the swivel 102.

Referring now to Figure 3, a plurality of scraper units 161 are provided, one for each of the disks 1. Each scraper unit comprises a scraper blade mounted at the lower end of a scraper arm 162 which is pivoted, as at 163, on a scraper supporting bar 164. Where the disks 1 are assembled together in two or more gangs, the scraper supporting bars 164 are of such length as to receive the corresponding number of scrapers. Each scraper supporting bar 164 is connected by a pair of bolts 166 to a pair of scraper supporting clips 167 secured, as by welding, to a rear side of the main frame tube 3. Each clip 167 has a rearwardly offset portion that is slotted, as at 169, to receive the scraper supporting bolts 166 in a quick detachable way whereby the mounting and dismounting of the scraper units is facilitated. The upper end of each of the scraper arms 162 is apertured to receive a tensioning rod 171, there being one such rod for each group of scraper units, the rod extending through the apertures in the associated group of scraper arms 162. A spring 172 is disposed against the upper end of each scraper arm, and the springs 172 are mounted on the tensioning rod 171. A plurality of set screw collars 173 is mounted on the rod 171 to receive the associated springs 172. The right or forward end of the rod 171 is pivotally connected, as at 176, to a toggle linkage 177 which is arranged to provide for yieldably holding the scraper blades up against the associated disks 1 or providing for their release. The toggle linkage 177 includes the link 178 pivoted at 176 to the tensioning rod 171. At its outer end the link 178 is connected at 179, as by a plow bolt or the like, to a hand lever 181, and the latter is pivotally connected, as by a plow bolt 182, to the upper end of a bracket 183 which is bolted at 184 or otherwise fixed to the front end of the main frame tube 3. An abutment 185, preferably in the form of a bolt, is carried by the hand lever 181 and cooperates with the link 178 to form a stop for holding the toggle link parts against relative movement when the scrapers are held up against the disks 1, which is the position shown in Figure 3. When it is desired to relieve the scrapers, the hand lever is swung over toward the right, as viewed in Figure 3, which swings the pivoted end of the hand lever 181 to the left and thus moves the link 178 to the left, which relieves the scrapers of any pressure due to the compressing of the springs 172 by virtue of holding the tensioning rod 171 in the position shown in Figure 3.

It will be noted, particularly from Figure 1, that the point of hitch, namely at the swivel 102, lies quite low, and hence there is no great tendency, even under heavy going, to overturn the implement forwardly. In order, however, to hold the disk gangs in an upright position, the land wheel frame 4 extends well forwardly so that the land wheel 81 is practically opposite the front furrow wheel 25. In other machines with which we are familiar, attempts have been made to overcome the above mentioned overturning tendency by adding an excessive weight to the rear portion of the land wheel frame and/or the rear land wheel itself, but such necessity for excessive weight is avoided in the present machine by virtue of the use of a long land wheel frame 2 and the forward positioning of the front land wheel 81.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A disk tiller comprising a frame including a diagonal member and a generally fore and aft extending member pivotally connected at a generally central point with the rear end of said diagonal member, ground working tools carried by said diagonal member, a front furrow wheel connected with the front end of said diagonal member, a rear furrow wheel connected with the rear end of said generally fore and aft extending member, a hitch connected with the diagonal member, a caster wheel connected with the forward end of said fore and aft extending member, said second mentioned member extending forwardly a distance substantially sufficient to bring said caster wheel generally laterally opposite said front furrow wheel whereby the tendency for the forward draft pull to overturn the tiller forwardly is resisted by the weight of said members and associated parts acting about said caster and front furrow wheels as a fulcrum, and means for adjustably fixing said frame members in different positions of angular adjustments.

2. A disk tiller comprising a frame including a diagonal member and a generaly fore and aft extending member pivotally connected at a generally central point with the rear end of said diagonal member, ground working tools carried by said diagonal member, a steerable front furrow wheel connected with front end of said diagonal member, a rear furrow wheel connected with the rear end of said generally fore and aft extending member, a hitch connected with the diagonal member and including a steering part connected with said steerable front furrow wheel, a caster wheel connected with the forward end of said fore and aft extending member, said second mentioned member extending forwardly a distance substantially sufficient to bring said caster wheel generally laterally opposite said front furrow wheel whereby the tendency for the forward draft pull to overturn the tiller forwardly is resisted by the weight of said members and associated parts acting about said caster and front furrow wheels as a fulcrum, and means for adjustably fixing said frame members in different positions of angular adjustments.

3. A disk tiller comprising a frame including a diagonally disposed member and a generally fore and aft extending member, means pivotally connecting the rear end of said diagonal member to the generally central portion of the fore and aft extending member, a front land wheel connected to the front end of said fore and aft extending member and adapted to caster, a rear furrow wheel connected to the rear portion of said fore and aft extending member and connected therewith for adjustment about a generally vertical axis means for fixing the rear furrow wheel against swinging about said axis, bracket means fixed to the front portion of said diagonally disposed member, a front furrow wheel having a spindle carried for both turning and up-and-down movement along a generally vertical axis in said bracket, a hitch connected with the forward portion of said generally diagonally disposed member and including a steering part connected with said steerable front furrow wheel, and said generally fore and aft extending member extending forwardly of the rear end of said diagonally disposed member a distance sufficient to position the caster wheel at the front end of said fore and aft extending member in a position sufficiently forward whereby the tendency for the forward draft pull applied to the diagonally disposed member to overturn the tiller forwardly is resisted by the weight of the portions of the frame and associated parts rearwardly of the castering land wheel, said land wheel castering to accommodate turning of the tiller by lateral swinging of the hitch and the resulting turning of the front steerable furrow wheel without the provision of steering connections to the castering land wheel.

WALTER H. SILVER.
JOHN I. CANTRAL.

REFERENCES CITED

The following references are of record in the file of this patent:

UNITED STATES PATENTS

| Number | Name | Date |
| --- | --- | --- |
| 9,172 | Witty | Oct. 14, 1835 |
| 315,813 | Mohney | Apr. 14, 1885 |
| 614,137 | Seitz | Nov. 15, 1898 |
| 678,618 | Hobson | July 16, 1901 |
| 735,096 | Hickman | Aug. 4, 1903 |
| 922,885 | Gourlay | May 25, 1909 |
| 991,961 | Donald | May 9, 1911 |
| 1,243,560 | Shaffer | Oct. 16, 1917 |
| 1,347,818 | Malin | July 27, 1920 |
| 1,410,813 | Kammeyer | Mar. 28, 1922 |
| 1,455,687 | Walton | May 15, 1923 |
| 1,472,768 | Dickinson | Oct. 30, 1923 |
| 1,663,813 | Paul | Mar. 27, 1928 |
| 1,737,420 | Hendricks | Nov. 26, 1929 |
| 1,819,292 | Hendricks | Aug. 18, 1931 |
| 1,944,674 | Silver | Jan. 23, 1934 |
| 2,158,746 | Dinwiddie | May 16, 1939 |
| 2,205,403 | Frank | June 25, 1940 |
| 2,256,816 | Scarlett | Sept. 23, 1941 |
| 2,331,006 | Suttles | Oct. 5, 1943 |
| 2,370,374 | Silver | Feb. 27, 1945 |
| 2,376,455 | Silver | May 22, 1945 |
| 2,377,410 | Field | June 5, 1945 |
| 2,426,354 | Johnston | Aug. 26, 1947 |